(12) United States Patent
Dekens

(10) Patent No.: US 11,366,940 B2
(45) Date of Patent: Jun. 21, 2022

(54) SECURE-AWARE BUS SYSTEM

(71) Applicant: Nordic Semiconductor ASA, Trondheim (NO)

(72) Inventor: Berend Dekens, Trondheim (NO)

(73) Assignee: Nordic Semiconductor ASA, Trondheim (NO)

( * ) Notice: Subject to any disclaimer, the term of this patent is extended or adjusted under 35 U.S.C. 154(b) by 0 days.

(21) Appl. No.: 17/255,921

(22) PCT Filed: Jun. 27, 2019

(86) PCT No.: PCT/EP2019/067223
§ 371 (c)(1),
(2) Date: Dec. 23, 2020

(87) PCT Pub. No.: WO2020/002534
PCT Pub. Date: Jan. 2, 2020

(65) Prior Publication Data
US 2021/0117579 A1    Apr. 22, 2021

(30) Foreign Application Priority Data

Jun. 28, 2018  (GB) ..................................... 1810659

(51) Int. Cl.
*G06F 21/85*   (2013.01)
*G06F 21/56*   (2013.01)
(Continued)

(52) U.S. Cl.
CPC ............ *G06F 21/85* (2013.01); *G06F 21/567* (2013.01); *G06F 21/6209* (2013.01); *G06F 21/74* (2013.01); *G06F 21/79* (2013.01)

(58) Field of Classification Search
CPC .... G06F 21/567; G06F 21/62; G06F 21/6209; G06F 21/71–74; G06F 21/76;
(Continued)

(56) References Cited

U.S. PATENT DOCUMENTS

| 5,579,531 A | 11/1996 | Sugita |
| 7,650,645 B1 | 1/2010 | Langendorf et al. |

(Continued)

FOREIGN PATENT DOCUMENTS

| CN | 105631364 A | 6/2016 |
| CN | 105825128 A | 8/2016 |

(Continued)

OTHER PUBLICATIONS

U.S. Appl. No. 17/048,937, filed Oct. 19, 2020, Talvitie et al.
(Continued)

*Primary Examiner* — Kevin Bechtel
(74) *Attorney, Agent, or Firm* — Klarquist Sparkman, LLP

(57) ABSTRACT

An integrated-circuit device includes a bus system, a plurality of master components, a plurality of slave components, and hardware filter logic. The bus system is configured to carry bus transactions and security-state signals for distinguishing between secure and non-secure transactions. The master components are switchable between a secure and a non-secure state. The hardware filter logic is configured to intercept bus transactions at an interception point, positioned within the bus system such that bus transactions from at least two of the master components and at least two slave components pass the interception point. It is also configured to use i) a slave address of the intercepted bus transaction, and ii) the security state of the intercepted bus transaction, to determine whether to allow the transaction, in accordance with a set of filtering rules, and to block intercepted bus transaction that are determined not to be allowed.

15 Claims, 2 Drawing Sheets

(51) Int. Cl.
  *G06F 21/62* (2013.01)
  *G06F 21/79* (2013.01)
  *G06F 21/74* (2013.01)
(58) Field of Classification Search
  CPC . G06F 21/79; G06F 21/85; H04L 63/10–105; H04L 63/20–205
  See application file for complete search history.

(56) References Cited

U.S. PATENT DOCUMENTS

| | | | |
|---|---|---|---|
| 8,719,925 | B1 | 5/2014 | Berg |
| 2003/0200451 | A1 | 10/2003 | Evans et al. |
| 2004/0143714 | A1 | 7/2004 | Watt |
| 2004/0250063 | A1 | 12/2004 | Gulick et al. |
| 2005/0033969 | A1 | 2/2005 | Kiiveri et al. |
| 2005/0114616 | A1 | 5/2005 | Tune et al. |
| 2006/0090084 | A1 | 4/2006 | Buer |
| 2008/0052534 | A1 | 2/2008 | Harada et al. |
| 2009/0292901 | A1 | 11/2009 | Henry et al. |
| 2010/0186080 | A1 | 7/2010 | Thanner et al. |
| 2011/0225651 | A1 | 9/2011 | Villasenor et al. |
| 2012/0036347 | A1 | 2/2012 | Swanson et al. |
| 2012/0047576 | A1 | 2/2012 | Do et al. |
| 2012/0110659 | A1 | 5/2012 | Brokish et al. |
| 2013/0031374 | A1 | 1/2013 | Thom et al. |
| 2013/0047250 | A1 | 2/2013 | Kothari |
| 2014/0188732 | A1 | 7/2014 | Kobres |
| 2014/0282819 | A1 | 9/2014 | Sastry et al. |
| 2014/0304439 | A1 | 10/2014 | Elahi et al. |
| 2014/0366131 | A1* | 12/2014 | Lai .................... G06F 21/85 726/21 |
| 2015/0378944 | A1 | 12/2015 | Robertson et al. |
| 2016/0004647 | A1 | 1/2016 | Eppensteiner et al. |
| 2016/0004656 | A1* | 1/2016 | Arbel .................... G06F 21/85 710/110 |
| 2016/0267038 | A1 | 9/2016 | Elahi et al. |
| 2016/0357991 | A1 | 12/2016 | Hershman et al. |
| 2017/0060637 | A1* | 3/2017 | Persson .................. G06F 21/55 |
| 2017/0139851 | A1 | 5/2017 | Pean et al. |
| 2018/0060077 | A1 | 3/2018 | Abdulhamid et al. |
| 2018/0136967 | A1 | 5/2018 | Asbe et al. |
| 2018/0144145 | A1 | 5/2018 | Pearson |
| 2018/0239727 | A1 | 8/2018 | Hershman et al. |

FOREIGN PATENT DOCUMENTS

| | | |
|---|---|---|
| CN | 105683981 B | 10/2018 |
| DE | 102013101508 A1 | 8/2013 |
| EP | 2 725 517 A1 | 4/2014 |
| GB | 2 396 713 A | 6/2004 |
| GB | 2 396 930 A | 7/2004 |
| GB | 2 497 528 A | 6/2013 |
| GB | 2 501 470 A | 10/2013 |
| GB | 2 531 844 A | 5/2016 |
| GB | 2 539 455 A | 12/2016 |
| WO | WO 2013/088121 A1 | 6/2013 |
| WO | WO 2016/203193 A1 | 12/2016 |

OTHER PUBLICATIONS

U.S. Appl. No. 17/255,872, filed Dec. 23, 2020, Winblad et al.
U.S. Appl. No. 17/255,876, filed Dec. 23, 2020, Barzic et al.
ARM1176JZ-S, Revision: r0p7, Technical Reference Manual, Table of Contents, List of Tables, List of Figures, Preface, Figure 2-2, Nov. 27, 2009, 24 pages.
ARM AMBA Arbiter Data Sheet, Chapter 1, Copyright © 1995-1997 ARM Limited, 10 pages.
ARM AMBA 5 AHB Protocol Specification AHB5, AHB-Lite, Copyright © 2001, 2006, 2010, 2015 ARM Limited or its affiliates, 86 pages.
ARM AMBA 3 AHB-Lite Protocol v1.0 Specification, Copyright © 2001, 2006 ARM Limited, 72 pages.
ARM CoreLink SIE-2000 System IP for Embedded, Revision: R2p0, Technical Reference Manual, Copyright © 2016 ARM Limited or its affiliates, 155 pages.
Arm® CoreLink™ SSE-200 Subsystem for Embedded, Revision: r1p0, Technical Reference Manual, Copyright © 2016, 2017 Arm Limited (or its affiliates), 178 pages.
ARM Cortex-M33 Processor Technical Reference Manual, B3.1 About Security Attribution and Memory Protection, http://infocenter.arm.com/help/topic/com.arm.doc.100230_0002_00_en/jfa1433859029571.html, downloaded Jun. 14, 2018, 2 pages.
ARM Security Technology, 2009, Building a Secure System using TrustZone (RTM) technology, arm.com, [online], available from: http://infocenter.arm.com/help/topic/com.arm.doc.prd29-genc-009492c/PRD29-GENC-009492C_trustzone_security_whitepaper.pdf, [Accessed Oct. 16, 2018].
ARM—TrustZone technology for the ARMv8-M architecture, Copyright © 2017 ARM Limited or its affiliates, 28 pages.
Cyclone v Hard Processor System Technical Reference Manual, Altera, Cover Page, Table of Contents, Chapter 7, pp. 16, 36-60 and Chapter 11, p. 23, Oct. 28, 2016.
International Search Report and Written Opinion for PCT/EP2019/060004, dated Jul. 17, 2019, 12 pages.
IPO Search Report under Section 17(5) for GB 1806465.9, dated Oct. 18, 2018, 6 pages.
New AMBA Specification Extends Security to Embedded Design: AMBA 5 AHB5, https://community.arm.com/processors/b/blog/posts/new-amba-specification-extends- . . . , downloaded Apr. 25, 2018, 6 pages.
Payne, "How to Implement a Secure IoT system on ARMv8-M," Published on Apr. 14, 2017, 3 pages.
TrustZone—Arm Developer, arm TrustZone, Introducing Arm TrustZone, https://developer.arm.com/technologies/trustzone, downloaded Apr. 25, 2018, 11 pages.
Yee, Carnegie Mellon University, 1994, "Using Secure Coprocessors", Bennet Yee, citeseerx.ist.psu.edu. [online]. Available from: http://citeseerx.ist.pdu.edu/viewdoc/download?doi=10.1.1.28.4872&rep=rep1&type=pdf, [Accessed Oct. 16, 2018].
Murray, John M., "Microcomputer Peripherals," IEEE Transactions on Industrial Electronics and Control Instrumentation, vol. IECI-25, No. 4, Nov. 1978, pp. 303-322.

* cited by examiner

SECURE-AWARE BUS SYSTEM

CROSS REFERENCE TO RELATED APPLICATIONS

This is the U.S. National Stage of International Application No. PCT/EP2019/067223, filed Jun. 27, 2019, which was published in English under PCT Article 21(2), which in turn claims the benefit of Great Britain Application No. 1810659.1, filed Jun. 28, 2018.

BACKGROUND OF THE INVENTION

This invention relates to a bus system for an integrated-circuit device and methods of operating the same.

Integrated-circuit processing devices, such as system-on-chip (SoC) and radio-on-a-chip devices, commonly use a bus system, such as an Arm™ AMBA (Advanced Microcontroller Bus Architecture) bus system, to provide communication between a processor, memory, and peripherals, that all are integrated on the device.

The memory of such a device may contain sensitive information, such as data or software code, to which access should be restricted. Similarly, some peripherals, such as cryptographic accelerators, may handle sensitive data, or provide other sensitive functions. It can therefore be desirable to limit access to certain memory regions and/or to certain peripherals only to "trusted" software code, such as code developed by the device manufacturer, and to block access by other code, such as application code developed by a third party.

Restricting access to certain regions of memory, or to certain peripherals, through software measures alone is not particularly secure, and can be vulnerable both to hacking and to software bugs. Hardware mechanisms are generally considered to be more secure.

Arm™ TrustZone provides compatible Arm™ microcontrollers (e.g., a Cortex™-M33) with two operating states: "Secure" and "Non-Secure".

Arm™'s Advanced High-Performance Bus (AHB) specification "AHB 5" is an open interface protocol for embedded SoCs. It defines an additional signal, HNONSEC, on the bus system that can be asserted by a compatible Arm™ TrustZone processor, during the address phase of a bus transfer, to distinguish between a "Secure" bus transfer and a "Non-secure" bus transfer.

The product designer can designate certain regions of memory and/or certain peripherals (e.g., a cryptoprocessor), as being "secure-world" resources, while other regions of memory and peripherals are not so designated. A peripheral may be permanently "secure" or "non-secure", or its status can be configured by software through a Peripheral Protection Control (PPC) register. Hardware logic in the bus fabric ensures that no "secure-world" resources can be accessed directly by "non-secure-world" software, thereby providing a security perimeter around sensitive resources. Bus infrastructure components can support partitioning of memory spaces in memory components, to block non-secure accesses to secure memories.

Secure transactions can only be generated by secure software or, in cases of testing, an authorised debugger. Non-secure (non-trusted) software applications cannot access secure (trusted) resources directly, but must request access through APIs (application programming interfaces) provided by secure software. These APIs can implement authentication checks to decide whether to permit access to a secure service. This approach makes it harder for attackers, who may have compromised part of the non-secure software code, to access sensitive information stored on such a device, or for software bugs to inadvertently gain access to secure resources.

In such an architecture, the access restrictions can be implemented using a "Secure Attribution Unit" (SAU) and an "Implementation Defined Attribution Unit" (IDAU), which are directly connected to the Arm™ TrustZone-aware processor. The device memory map (which covers all of the system memory and all the memory-mapped peripheral registers) can be divided into secure and non-secure address ranges. These units enable security attributes to be set based on target address. They can also apply filtering by causing a SecureFault exception in the processor if the processor attempts a data access to an address that is marked as Secure, while the processor is in a Non-secure state. Thus, address-based filtering is performed at the processor itself. In some systems, additional filtering may also be provided by filter units that are located next to slave components, such as adjacent peripherals and memories, around other edges of the bus infrastructure.

The use of such filtering, based on security states, can provide increased security for an integrated-circuit device. However, this existing approach does not always provide an efficient and flexible implementation, especially on systems that have multiple bus masters.

The present invention therefore seeks to provide an alternative approach to securing bus transactions on integrated-circuit devices.

SUMMARY OF THE INVENTION

From a first aspect, the invention provides an integrated-circuit device comprising:
  a bus system, configured to carry bus transactions and to carry security-state signals for distinguishing between secure bus transactions and non-secure bus transactions;
  a plurality of master components, each being switchable between a secure state and a non-secure state, and being configured to initiate secure bus transactions when in the secure state, and to initiate non-secure bus transactions when in the non-secure state;
  a plurality of slave components; and
  hardware filter logic, wherein:
  the hardware filter logic is configured to intercept bus transactions at an interception point within the bus system, the interception point being positioned within the bus system such that bus transactions from at least two of the master components pass the interception point, and such that bus transactions for at least two of the slave components pass the interception point; and
  the hardware filter logic is configured, for each intercepted bus transaction, to use i) a slave address of the intercepted bus transaction, and ii) the security state of the intercepted bus transaction, to determine whether to allow the intercepted bus transaction, in accordance with a set of filtering rules, and is configured to block intercepted bus transaction that are determined not to be allowed.

From a second aspect, the invention provides a method of operating an integrated-circuit device, wherein the integrated-circuit device comprises:
  a bus system for carrying bus transactions and for carrying security-state signals for distinguishing between secure bus transactions and non-secure bus transactions;

a plurality of master components, each being switchable between a secure state and a non-secure state, and being configured to initiate secure bus transactions when in the secure state, and to initiate non-secure bus transactions when in the non-secure state; and a plurality of slave components, the method comprising:

the bus system carrying secure bus transactions and non-secure bus transactions;

intercepting bus transactions at an interception point within the bus system, the interception point being positioned within the bus system such that bus transactions from at least two of the master components pass the interception point, and such that bus transactions for at least two of the slave components pass the interception point;

using the address of an intercepted bus transaction and the security state of the intercepted bus transaction to determine whether to allow the intercepted bus transaction, in accordance with a set of filtering rules; and blocking the intercepted bus transaction when the intercepted bus transaction is determined not to be allowed.

Thus it will be seen that, in accordance with the invention, at least some of the filtering of bus transaction is provided at an interception point positioned wholly within the bus system, rather than filtering only at the edges of the bus system (i.e. not just filtering adjacent the processor, or adjacent a slave component). In many cases, this can allow for a more efficient implementation of the filtering rules.

In particular, filtering at each master component, as is known in the art, can require each master-component filter unit to implement its own set of filtering rules for each and every slave component on the device (e.g., specifying slave address ranges that the master component is not allowed to access when the master component is in a non-secure state), even though some or all of the filtering rules may be the same for two or more of the master components. This leads to an inefficient duplication of filtering logic, which can be mitigated by embodiments of the present invention, where a single filter unit may be positioned to intercept bus requests from both, or all, such master components.

Embodiments of the present invention can also provide greater efficiency and flexibility than a naïve implementation that provides respective filter units adjacent the slave components.

Firstly, performing at least some of the bus filtering at an interception point located within the bus system can advantageously result in shorter timing paths for the bus system, compared with performing the same filtering at the slave edges. This is because such filtering can lead to earlier rejection of non-allowed bus requests.

Secondly, embodiments of the present invention can support a particularly efficient integrated-circuit design, especially where some of the filtering rules apply only to a subset of the master components (i.e., where the filtering rules distinguish between the master components, so are not the same for all of the master components). Many bus systems do not communicate the identity of an initiating bus master to the receiving slave component. This means that slave-edge filtering cannot implement filtering rules that discriminate between different master components. By contrast, by intercepting bus transactions at an interception point within the bus system, embodiments of the present invention are able to implement filtering rules at that interception point, for a particular slave component, that apply to some, but not all, of the master components. The hardware filter logic may be further configured to intercept bus transactions from other master components at a second interception point, and to apply different filtering rules for the same slave component, at the second interception point. In this way, the filtering rules that are applied to a particular slave component can depend on which master component initiates the bus transaction. This can be achieved without the inefficiency of having to duplicate all the filtering rules at every master component, as already explained. Thus, in some embodiments, for at least one slave component, the hardware filter logic implements first filtering rules (i.e., a subset of the filtering rules implemented by the filter logic as a whole) for bus transactions to the slave component from a first master component, and implements second filtering rules, different from the first filtering rules, for bus transactions to the slave component from a second master component.

However, it is not essential that the filtering rules vary depending on which master component initiated a bus transaction. For example, the filtering rules may simply require that, for a set of one or more of the slave components, no non-secure bus transactions (initiated by any master component) are allowed to reach these slave components, but that all secure bus transactions (initiated by any master component) are receivable by all slave components. As explained in more detail below, each of the slave components may also have a fixed or variable security state. Thus, each slave component may be in a secure state (referred to herein as a "secure slave") or in a non-secure state (a "non-secure slave"). The filtering rules for a slave component may depend on the security state of that slave component—for example, the filtering rules may specify that all non-secure bus transactions (initiated by any master component) should not be received by any secure slave component (i.e., the filter logic should block all non-secure bus transactions containing a slave address assigned to slave component that is in the secure state).

In some embodiments, the filtering rules may determine, for each pairing of master component and slave component, whether secure bus transactions initiated by the master component are allowed to be received by the slave component, and whether non-secure bus transactions initiated by the master component should be received by the slave component. The filtering rules may be specified at the component level (where a component may be a particular peripheral, or a particular region of memory), rather than at the address level. In other words, bus transactions for every address assigned to a particular peripheral or memory region may be treated in the same way, by the filter logic. This can simplify the design and use of the device.

The hardware filter logic may be arranged to intercept bus transactions at one or more further interception points in the bus system. These could be the same bus transactions or different bus transactions. A plurality of the interception points may be such that, for each of the interception points, bus transactions from at least two respective master components pass the interception point, and such that bus transactions for at least two respective slave components pass the interception point. However, one or more of the further interception points may be adjacent a single master component or may be adjacent a single slave component—i.e., located at an edge of the bus system. At least for some sets of filtering rules, filtering at a bus edge, in combination with filtering at one or more interception points wholly within the bus system, may allow for a more efficient implementation than just filtering wholly within the bus system.

The hardware filter logic may comprise one or more filter units for intercepting bus transactions at respective interception points.

Typically, the filtering rules will be such that, for each interception point, there will be at least one respective slave address (and, optionally, a corresponding slave security state) for which a secure bus transfer is allowed to pass the interception point and for which a non-secure bus transaction is not allowed to pass the interception point. (However, this is not necessarily the case in every embodiment.)

One or more of the interception points may be at a bus arbiter. One or more of the interception points may be at a bridge between a first bus and a second bus—e.g. at a bridge between a first AHB (Advanced High-Performance Bus) and a second AHB, or at a bridge between an AHB and an APB (Advanced Peripheral Bus), or at a bridge between a first APB and a second APB.

The bus system may be a multi-layer bus system (i.e. supporting parallel access paths between masters and slaves) and one or more of the interception points may be between two respective bus layers of the (multi-layer) bus system.

The hardware filter logic may be configured to intercept bus transactions at one or more bus arbiters and/or one or more bridges.

The hardware filter logic may comprise one or more master-component filter units configured to apply at least some of the filtering rules within, or adjacent, a respective master component. Such a master-component filter unit may connected to a master component, or may be located between a master component and the bus system (e.g., at an interception point at a master edge of the bus). For a master component that is an Arm™ processor, a master-component filter unit, connected to the Arm™ processor, may comprise an Arm™ Implementation Defined Attribution Unit (IDAU) and/or an Arm™ Secure Attribution Unit (SAU).

The hardware filter logic may additionally comprise one or more slave-component filter units configured to apply at least some of the filtering rules within or adjacent one or more respective slave components. A slave-component filter unit may be located between the bus system and a slave component (e.g., at an interception point at a slave edge of the bus).

The plurality of master components may include at least one processor, or combination of a processor and an IDAU and/or SAU. The device may comprise a plurality of processors. Each processor may be an Arm™ Cortex™-M series processor, or any other processor. The processor may be inherently security-aware. The processor (optionally including an IDAU and/or SAU) may be configured to output a security-state signal to the bus system that indicates whether a bus transaction initiated by the processor is secure or non-secure. The processor may be able to switch itself between a secure state and a non-secure state under the control of software instructions executed on the processor.

Alternatively, a processor component, being one of the master components, may comprise a non-security-aware processor in combination with a hardware security module. The hardware security module may be switchable between a secure state and a non-secure state, and may be configured to output a security-state signal onto the bus system for each bus transaction initiated by the processor, wherein the security-state signal indicates a secure bus transaction when the hardware security module is in the secure state, and indicates a non-secure bus transaction when the hardware security module is in the non-secure state. In this way, the hardware security module enables the non-security-aware processor to form a processor component that is a security-aware master component. The hardware security module may be connected directly to the processor, or it may be positioned at the edge of the bus system adjacent the processor.

More generally, such a hardware security module may be combined with any other bus master (the design of which may not be inherently security-aware), to provide a master component that is switchable between a secure state and a non-secure state, and that is configured to initiate secure bus transactions when in the secure state, and to initiate non-secure bus transactions when in the non-secure state. The master component may comprise a core and a hardware security module, the core having a bus interface for initiating bus transactions without security-state signals, wherein the hardware security module is situated between the bus interface and the bus system.

The use of such hardware security modules can enable bus masters to be assigned security attributes in the bus layer. This means that bus masters can be unaware of the system security layer. This can have a number of benefits, including improving timing, simplifying the bus master design, and allowing legacy bus master designs to be used in a security-aware device.

The plurality of master components may include one or more peripherals (e.g., a radio, a serial connection, or an analogue-to-digital converter), that have integral DMA (direct memory access) controllers for initiating bus transactions on the bus system. Such peripherals may also be slave components (e.g., being configured to receive bus requests to a register interface), in addition to being master components.

In addition to the plurality of master components that support secure and non-secure states, the device may comprise one or more fixed-state master components that are hardwired to be always in a secure state (i.e., to output a security-state signal representing a secure state with every bus transaction they initiate) or to be always in a non-secure state (i.e., to output a security-state signal representing a secure state with every bus transaction they initiate). The filtering rules may determine which slave components can receive bus transactions from such fixed-state master components.

The slave components may include one or more peripherals. They may include one or more memories, or memory regions.

The peripherals may have respective memory-mapped register interfaces, accessible over the bus system. The device may implement a global memory map which assigns respective addresses to one or more memories (e.g., RAM and flash) and to respective peripherals.

The device may comprise a memory. The memory may comprise volatile memory, such as RAM, and/or non-volatile memory, such as flash. The hardware filter logic may comprise a memory controller for controlling access to the memory. The memory controller may be regarded as another filter unit.

The memory may comprise one or more secure regions and one or more non-secure regions.

The memory controller may be configured to receive memory-access requests over the bus system, and to determine whether the received memory-access requests is a secure bus transfer. The memory controller may be configured to grant access to a secure region of the memory in response to receiving a secure-state memory-access request; it may be configured to deny access to the secure region of the memory in response to receiving a non-secure memory-access request. The memory controller may the address of a received bus transaction, and the security state of the bus transaction, to determine whether to allow or block the bus transaction.

The definition of a region of the memory may be hardwired—e.g., with the memory being divided into a plurality of identically-sized regions, each of which may be configured to be a secure region or a non-secure region. Alternatively, the definition of a region may be configurable—e.g., depending on one or more configuration parameters, which may be stored in a non-volatile memory of the device, such as a start address value, and a length or end address value.

One or more of the slave components may be assigned a respective security state—e.g., secure or non-secure. The filtering rules may additionally depend on the security states of the slaves components. The hardware filter logic may use one or more slave-component security states when determining whether bus transactions should be received by a slave component, and/or whether non-secure bus transactions initiated by a master component should be received by the slave component. The hardware filter logic may therefore additionally use the security state of a slave component associated with the address of an intercepted bus transaction when determining whether to allow or block the intercepted bus transaction.

One or more slave components may have a fixed (i.e., hardwired) security state. However, alternatively or additionally, one or more slave components may be switchable between a secure state and a non-secure state. The state of a slave component may depend on configuration data stored in a memory of the device. The state may be controllable by software executing on the device.

In general, the secure and non-secure states of the master components, and optionally also of the slave components, can be used however a designer wishes.

Typically, software code executing on a processor (being one of the master components) will be divided into secure code and non-secure code, with non-secure code executing when the processor is in the non-secure state, and not being able access one or more secure slave components and/or one or more secure regions of memory, and with secure code executing when the processor is in the secure state, and being able to access the one or more secure slave components and/or the one or more secure regions of the memory (and potentially having access to all the peripherals and/or memory on the device, depending how the device is configured). In general, it is likely that the device will spend most of its execution time in the non-secure state, with only occasional switches to the secure state—e.g., after a cold or warm reset, or when storing a new cryptographic private key in a cryptoprocessor slave component—although this is not essential.

The security-state signals relate to the bus system and can potentially affect every component that is attached to the bus system. Note that these states, and the secure/non-secure component states, differ from processor modes, such as privileged/kernel and normal/user execution modes, which are implemented within one processor to restrict access to privileged processor instructions and system resources. Embodiments of the present device may also support privileged and non-privileged processor modes, in addition to the secure and non-secure states—i.e., the device may comprise a processor that supports privileged and non-privileged execution modes—but this is not essential.

A blocked bus transaction may simply be dropped without any further action, or the hardware filter logic may signal a breach of a filtering rule to the master component that initiated the bus transaction, or to another master component (such as a processor). The hardware filter logic may trigger an interrupt, or cause the device to reset, when an intercepted bus transaction breaks a filtering rule.

The hardware filter logic may be configured to intercept all bus requests that pass the interception point. The filtering may depend on a slave (target) address of an intercepted bus transaction. However, the filtering rules preferably specify access criteria at the component level—i.e., with the same filtering rules being applied to all memory addresses assigned to a register interface of a particular slave component (for a given security state of the slave component). The hardware filter logic may be configured to determine the slave address from an intercepted bus transaction. The hardware filter logic may comprise logic for comparing the address of an intercepted bus request with a predetermined set or range of address values.

The filtering rules may further depend on a type of each bus transaction—e.g., depending on whether the bus transaction is a data-read request, or a data-write request, or an instruction-fetch request. The hardware filter logic may be configured to read a bus access attribute from an intercepted bus request to determine whether the request is a data read, a data write, or an instruction fetch.

One or more of the master components may be configured to determine itself when to switch between a secure state and a non-secure state. However, in some embodiments, the device comprises a security protection unit (SPU) for switching at least some of the master components between a secure state and a non-secure state. The security protection unit may also allow one or more of the slave components to be switched between a secure state and a non-secure state. It may enable a memory region to be set as a secure region or a non-secure region.

The SPU may be connected to the hardware filter logic by a set of lines which propagate the security state of respective components to the device. There may be a respective line from the SPU to each bus master that is not inherently security-aware—i.e., to a respective hardware security module of each such master component. For each switchable slave component, there may be a respective line from the SPU to the hardware filter logic. It is possible that a line may branch, such that the security state of a single slave component affects a plurality of filter units at a plurality of interception points.

The SPU may provide a register interface, accessible over the bus system, which a bus master, such as a processor, may write to in order to control the state of each switchable component (including each individual memory region). Each switchable component or memory region may have an associated security-configuration register (which could be a bit-field) in the register interface, whose value determine the security state of the component. Providing such a register interface on an SPU can advantageously enable two or more master components, such as two different processors, both to configure security attributes on the device; it enables this to happen without collisions or conflicts, which might otherwise occur if security-state information were held locally at different points on the device.

Software stored on the device may comprise instructions for setting a value of a security-configuration register. For example, bootloader software may set the security state of some or all of the master and slave components during a boot routine, executed after each reset of the device. The states may remain unchanged between device resets (e.g., changing only if new firmware is loaded onto the device), or software may change the state of one or more master components between resets.

The hardware filter logic, or the SPU itself, may be configurable to prevent changes to a security-configuration value, at least until the device is next reset. For instance, there may be a lock register in the register interface of the SPU, which, when set, causes the SPU to ignore writes to one or more corresponding security-configuration registers.

Although the filter logic applies filtering decisions based on addresses, the filtering rules preferably determine access rules at the component level. In other words, for each slave component, the filtering rules are preferably applied equally to every memory address that is assigned to the particular slave component. (Note, however, that the filtering may additionally depend on a security state of the slave component.)

It should be understood that the filtering rules are not necessarily stored as data, e.g., encoded in a memory of the device (e.g., in ROM or flash), but may, at least in part, be hardwired into the filter logic of the device. Unlike the security states of the components, which are switchable for at least some components, the filtering rules may be fixed, although this is not essential.

The hardware filter logic may be a hardware state machine. It may comprise any number of logic gates. It preferably does not contain a general-purpose processor. It may comprise one or more input or output registers which may be addressable over the bus system, although this is not essential. The security protection unit may similarly be a hardware state machine.

The security-state signals may be sent over a security-state signal line in the bus system. The security-state signal line may be a dedicated line that is only used to indicate a security state. The line may be a single-bit line. In some embodiments, the security-state signal line may be asserted to indicate a secure bus transaction and de-asserted to indicate a non-secure bus transaction. In other embodiments, it may be the other way around. In general, it will be appreciated that outputting a security-state signal representing a non-secure state might, in some embodiments, consist of not outputting a signal representing a secure state (i.e., remaining silent), or vice versa.

In some embodiments, the bus system is an AMBA bus system. It may comprise one or more AHB's and/or one or more APB's. The bus system may implement the AHB 3, AHB 5 or higher specification. The secure-state signal may be sent over an AHB HNONSEC signal line—e.g., by de-asserting HNONSEC to communicate the secure-state signal.

The bus system may comprise a main bus (e.g., an AHB) and a peripheral bus. The peripheral bus may comprise a security-state signal line for carrying the security-state signal to one or more slave components attached to the peripheral bus. In some embodiments, an APB PPROT[1] signal may be used to convey the security state, or a non-standard (non-APB) signal. The security-state signal line on the peripheral bus may propagate a security-state signal received by the peripheral bus from the main bus. The provision of a security-state signal line on the peripheral bus allows the hardware filter logic to comprise one or more filter units, positioned to intercept bus transactions wholly within the peripheral bus (which may be a multi-level bus), or adjacent a slave component at an edge of the peripheral bus, wherein the filter unit receives the security-state signal and may use the security state of the intercepted bus transactions to determine whether to block or pass the bus transactions.

It will be appreciated that some embodiments may support more than two security states for master components and/or for slave components—e.g., having three states: a non-secure state, a secure state, and a very-secure state. The bus system may be configured to carry security-state signals that distinguish between three or more security states for each bus transaction.

The integrated-circuit device may be a system-on-chip, multiprocessor system-on-chip, radio-on-chip device, or any other form of integrated circuit.

Features of any aspect or embodiment described herein may, wherever appropriate, be applied to any other aspect or embodiment described herein. Where reference is made to different embodiments or sets of embodiments, it should be understood that these are not necessarily distinct but may overlap.

BRIEF DESCRIPTION OF THE DRAWINGS

Certain preferred embodiments of the invention will now be described, by way of example only, with reference to the accompanying drawings, in which.

DETAILED DESCRIPTION

Figure 1:
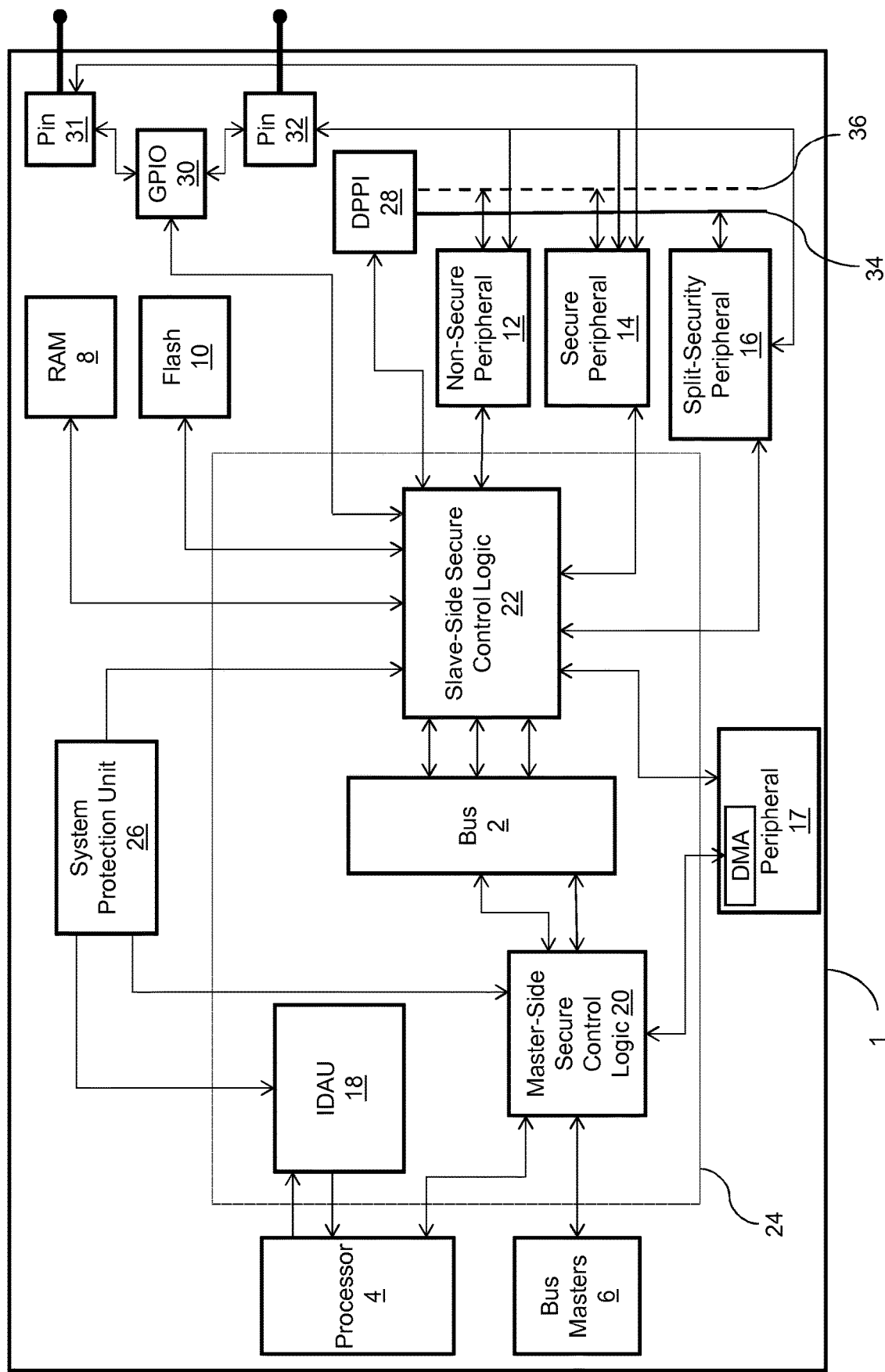
FIG. 1 is a schematic drawing of an integrated-circuit device embodying the invention.

FIG. 1 shows a system-on-chip (SoC) integrated circuit device 1 in accordance with an embodiment of the present invention.

The device 1 includes a bus interconnect system 2 connecting a processor 4 and other bus masters 6 to RAM 8, flash memory 10 and exemplary peripherals 12, 14, 16, 17. The peripherals 12, 14, 16, 17 have input and/or output registers that are addressable over the bus system 2 (i.e., memory-mapped I/O).

The bus system 2 may comprise a number of interconnected buses. In some embodiments, it is an Arm™ AMBA (advanced microcontroller bus architecture) bus system, and contains one or more Arm™ AHB's (advanced high performance buses) and one or more Arm™ APB's (advanced peripheral buses).

The master components 4, 6 are configured to issue bus requests on the bus interconnect system 2. The bus masters 6 may be other processors, peripherals with built-in DMA controllers, or any other bus masters. The bus requests can be either secure or non-secure bus requests depending on a security attribute of the master component 4, 6. The security attribute of the processor 4 is variable, depending the current state of the processor 4—it is typically under the control of software executing on the processor 4. The security attributes of other bus masters 6 may be fixed (i.e., hard-wired) or variable.

The memory 8, 10 and peripherals 12, 14, 16, 17 are configured to be responsive to certain requests depending on a respective security attribute of the memory or peripheral. The RAM 8 and flash memory 10 may be divided into regions which are assigned different respective security attributes (i.e., "secure" memory regions and "non-secure" memory regions).

The various memory regions and peripherals may be responsive to secure requests, non-secure requests, or both types of request. The security attribute of each memory region or peripheral may be fixed at the design stage or may be dynamically configurable.

Some peripherals 12 may be designated (permanently or switchably) "non-secure" peripherals and have all of their functions available to a bus master 4, 6 that is in a non-secure state. Some peripherals 14 may be designated (permanently or switchably) "secure" peripherals and have all of their functions available only to bus masters 4, 6 that are in a secure state. Still other peripherals 16 may be "split-security" peripherals, and, when designated (permanently or switchably) as "non-secure", such peripherals 16 will have some functions that are accessible to non-secure bus masters 4, 6 and other functions that are accessible only to secure bus masters 4, 6.

Some of the peripherals 17 are slave components on the bus system 2, but also contain DMA (direct memory access) controllers that allow them to act as bus masters—e.g., for reading or writing data from the RAM 8 without the involvement of the processor 4.

The device 1 further includes a general purpose input/output (GPIO) controller 30 which controls access to GPIO pins 31, 32, to which devices external to the device 1 can be connected. Each GPIO pin 31, 32 can have a security attribute assigned to it, as described in more detail below. The GPIO controller 30 has a register interface and acts as a further peripheral.

The device 1 further includes a distributed programmable peripheral interconnect (DPPI) 28. The DPPI 28 provides a matrix of interconnects, separate from the bus system 2, which connects peripherals 12, 14, 16 and allows one peripheral to signal an "event" to one or more other peripherals. Receipt of an "event" signal, over the DPPI 28, by a subscribing recipient peripheral, can trigger a task by the other peripheral.

The DPPI 28 provides a number of channels 34, 36 (two exemplary channels are shown in FIG. 1, but there may be more than two channels), which connect event outputs to task inputs. The peripherals 12-16 contain multiplexers, controllable by the processor 4 through respective register interfaces, for subscribing an event output of a peripheral to a particular channel, and for subscribing a task input of a peripheral to a particular channel.

The DPPI 28 provides a register interface for configuring the channels over the bus system 2, and is effectively a further slave peripheral.

The DPPI 28 can be used to support peripheral-to-peripheral communication while the processor 4 is in a sleep state, thereby providing substantial power savings compared with processor-mediated communication over the bus system 2.

Each channel 34, 36 can be defined as either secure 34 or non-secure 36. Only "secure" peripherals 14 can access a secure channel, to issue an event towards another peripheral, or to subscribe to the channel. If a "non-secure" peripheral 12 (which could be a split-security peripheral 16, when set to a "non-secure" state) attempts to push an event on a secure channel 34 then nothing will happen. If a non-secure peripheral 12, 16 attempts to subscribe to the secure channel 34 then it will not see any of the events on this channel.

The bus system 2 further comprises an implementation-defined attribution unit (IDAU) 18, master-side secure control logic 20, and slave-side secure control logic 22. The bus system 2, together with this secure control logic 20, 22 and attribution unit 18, are referred to herein as the security system logic 24 of the device 1.

This hardware security system logic 24 implements filtering rules that determine, for each pairing of master component 4, 6 and slave component 12, 14, 16, whether secure bus requests from the master component are receivable by the slave, and whether non-secure bus requests from the master component are receivable by the slave component. The filtering rules may also determine access permissions for the master components 4, 6 to defined regions of the RAM 8 and/or flash memory 10.

These filtering rules are typically fixed (i.e., hardwired) by design for every possible pairing of i) secure master to secure peripheral or memory region, ii) secure master to non-secure peripheral or memory region, iii) non-secure master to secure peripheral or memory region, and iv) non-secure master to non-secure peripheral or memory region. However, in some embodiments, the filtering rules may be configurable—e.g., depending at least partly on configuration data stored in the flash memory 10. The filtering rules may be relatively simple—for example, every secure bus-master can access every slave component (i.e. every peripheral and every memory region), whether the slave device is in a secure state or a non-secure state, while every non-secure bus-master can access only non-secure slave components and is blocked from accessing any secure slave component. Alternatively, the filtering rules may be more complex—for example, assigning different access rights to different bus-masters and/or different slave components, such that, e.g., a first processor can access a secure peripheral while the first processor in a secure state, whereas a second processor cannot access the same secure peripheral at all.

The device 1 further comprises a system protection unit (SPU) 26. The SPU 26 acts as a central point in the system to control access to memories, peripherals and other resources. The SPU 26 and security system logic 24 together provide the following features:

Arm™ TrustZone' support, allowing definition of Secure, Non-Secure and Non-Secure Callable memory regions;
  protects memory regions and peripherals from non-processor master devices, such as DMA controllers;
  DPPI 28 access protection, preventing non-secure code from publishing or subscribing to secured DPPI channels;
  GPIO pin access protection, preventing non-secure code and peripherals from reading or changing the state of a secure pin 31, 32; and
  external domain access protection, controlling access rights from other microcontrollers.

The SPU 26 provides a register interface comprising a set of configuration registers for controlling the various internal logic blocks 18, 20, 22 of the security system logic 24 that monitor access to memory-mapped slave devices (RAM 8, Flash 10, peripherals 12-17, etc.) and other resources (device pins 31, 32, DPPI channels, . . . ). The state of the SPU 26 determines the security states of all non-security-aware bus masters 6 and slave components 8, 10, 12-17. The SPU 26 also provides an interface for setting DPPI channels and GPIO pins as secure or non-secure. The SPU's register interface may itself be writable only by secure bus requests from the processor 4. The register interface may also contain "lock" bits which, once set, prevent further changes to the contents of respective parts of the SPU register interface until the device 1 is next reset. In this way, secure boot code can configured the SPU 26 during a boot process, and then lock the security state of the device 1 until it is next reset.

The master-side secure control logic 20 and slave-side secure control logic 22 provide a number of filter units (or firewalls), which intercept bus transfers and implement the filtering rules. These monitor access to the RAM 8, flash memory 10, memory-mapped peripherals 12, 14, 16, 17, including the GPIO controller 30, and the DPPI 28.

The filter units may be located at the edges of the bus system 2 and/or at points within the bus matrix, such as at a bridge between individual buses and/or at a bus arbiter and/or between two layers of the bus system 2. At least one firewall is located within the bus system 2, away from the edges of the bus system 2. The filter units compare the address, security state (secure or non-secure), and access type (data-read, data-write, instruction fetch), of each intercepted bus transfer with security definitions provided in the SPU 26. The security state of a bus transfer is determined by the security state of the master component that initiated the bus transfer, which can be either "secure" or "non-secure". In other embodiments multiple security statuses, or levels, may be supported (i.e., more than just two statuses).

When a prohibited access is detected, the firewall blocks the transfer (by returning a zero if it is a read access, or blocking a write operation). In some embodiments, the filter units may provide error signals through the bus system 2 and/or may trigger processor interrupts or a system reset.

The IDAU 18 can be used to indicate to the processor 4 whether particular memory addresses are Secure or Non-secure, under the control of the SPU 26. For a CPU 4 that supports ARM™ TrustZone' for Cortex-M™, the SPU 26 controls the IDAU 18 to provide full support for:

ARM™ TrustZone' for Cortex-M' related instructions such as TT for reporting the security attributes of a region; and Non-Secure Callable (NSC) regions, to implement Secure entry points from Non-Secure code.

Figure 2:
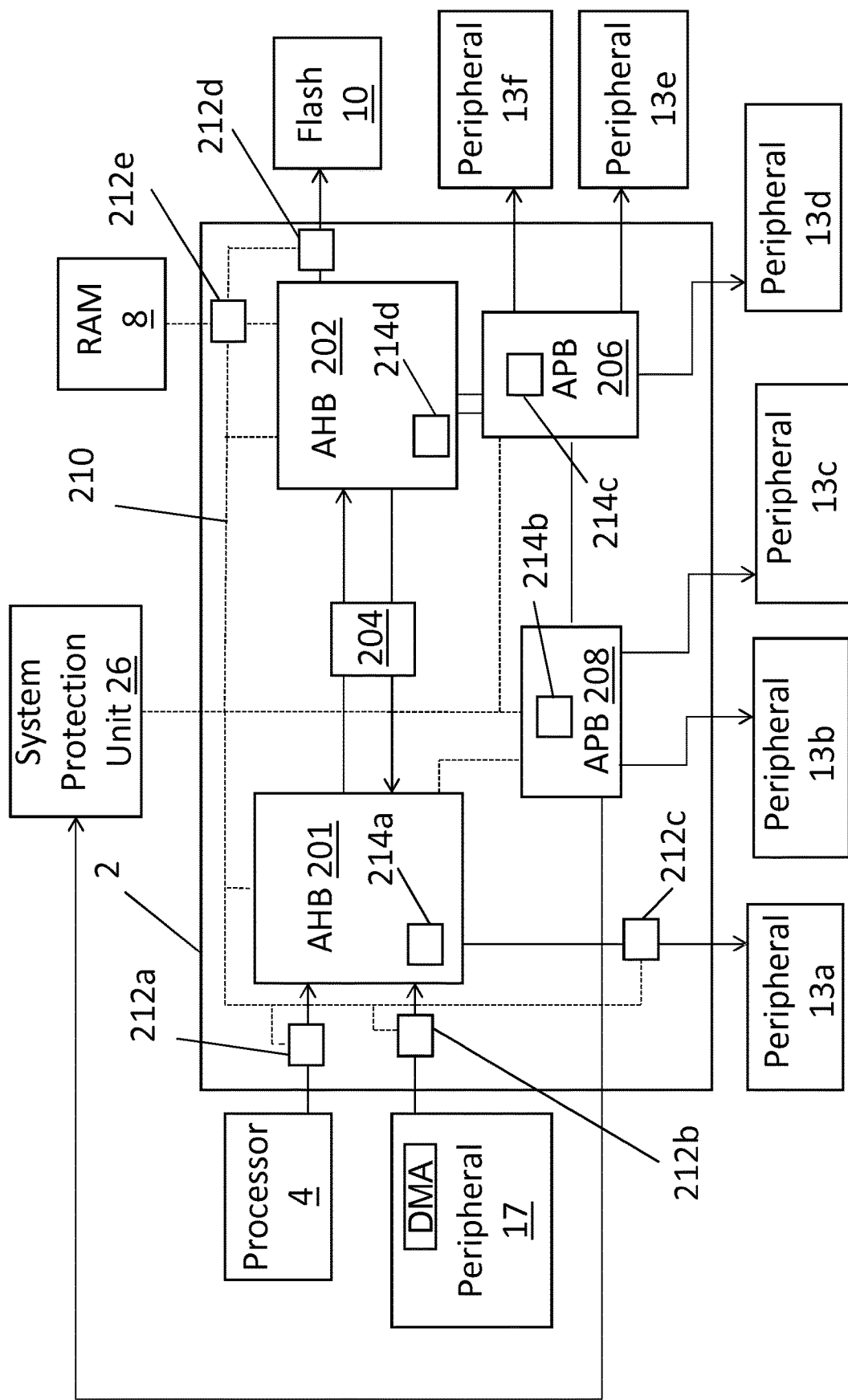
FIG. 2 is a schematic drawing of the integrated-circuit device showing further details of the bus system and the bus filtering.

FIG. 2 shows many of the same components as FIG. 1, with all like parts labelled with the same reference numerals as in FIG. 1.

The bus system 2 is shown as including a first AHB 201, a second AHB 202, a first APB 208, and a second APB 208. The first AHB 201 is connected to the second AHB 202 by means of bridge 204. Various exemplary slave peripherals 13a-13f (which may overlap with the peripherals 12, 14, 16, 17 shown in FIG. 1) are shown connected to the bus system 2. One exemplary peripheral 17 that has an integral DMA controller is connected, as a bus master, to the first AHB 201. Of course, there may be many more bus masters than are shown (e.g., ten, twenty, fifty or more) and many more slave peripherals than are shown (e.g., one hundred, two hundred or more).

FIG. 2 provides more detail of how the control logic 20, 22, represented schematically in FIG. 1, is integrated with the bus system 2. The control logic 20, 22 is implemented through a set of edge filter units 212a-212e positioned at the edges of the bus system, as well as a set of internal filter units 214a-214d positioned at points within the bus system 2, all connected by control lines 210. Some of the edge filter units 212 are located adjacent master components such as the processor 4 and exemplary DMA-equipped peripheral 17, while others are located adjacent slave components, such as a slave peripheral 13a. The internal filter units 214 are positioned at the arbiters of the AHBs 201, 202 and APBs 206, 208 or between pairs of layers in the bus system 2. In this way, the internal filter units 214 can implement master-to-slave filtering rules that apply to more than one bus master, more efficiently than if these rules were to be implemented using the edge filter units 212 adjacent the respective bus masters.

The filter units 212, 214 are configured to prevent bus transfers that do not comply with the filtering rules. The filtering rules for each master-slave pair are hardwired by the control logic 20, 22, for a given security state of the master and a given security state of the slave.

However, the security state of at least some of the masters 2, 17 and slaves (RAM 8, flash 10, and exemplary peripherals 13a-f) are configurable, being set by the components themselves (where the components are security-aware), or being set through the system protection unit (SPU) 26, for all non-security-aware components. For components that manage their own security status, their current secure/non-secure state is distributed over lines to relevant points in the filter logic 20, 22; this distribution may be direct from the component to the filter logic 20, 22, or the status may be sent via the SPU 26. The SPU 26 is the only place where the security attributes of components that are not inherently security-aware can be configured.

In some embodiments, the size and position of secure regions within the RAM 8 and flash memory 10 may be defined by writing to registers in the SPU 26—e.g., by writing start and end addresses. In other embodiments, the RAM 8 and flash 10 are pre-divided into fixed regions, each of which can have a respective security state set through the SPU 26. For example, the RAM 8 may be divided into 16 regions of 8 KiB each, and the flash 10 may be divided into 32 regions of 32 KiB each.

For each memory region, four different types of permissions can be independently configured through the SPU 26:

"Read": to allow data read access to the region (code fetch from this region is not controlled by the Read permission but by the Execute permission described below);

"Write": to allow write access to the region;

"Execute": to allow code fetch from this region (even if data read is disabled); and "Secure": to allow only secure bus accesses.

For every security-managed component, there is at least one respective line out of the SPU 26 that communicates the security state of that component to the control logic 20, 22 (i.e., to the appropriate filter units 212, 214) as a one-bit value. The SPU 26 can also communicate the security state of paths within the bus system 2, and of groups of components, to the filter logic 20, 22, 212, 214 in the bus system.

The SPU 26 allows non-secure-aware processors and non-secure-aware peripherals to be treated, by software developers, as security-aware components, even though they are not inherently security aware. The security states that are output by the SPU 26 for non-secure-aware components may be determined by configuration settings stored in SPU configuration registers. These configuration registers may be written to by a bootloader after each reset, or may be configured by any other appropriate mechanism.

It will be appreciated by those skilled in the art that the invention has been illustrated by describing one or more specific embodiments thereof, but is not limited to these embodiments; many variations and modifications are possible, within the scope of the accompanying claims.

The invention claimed is:

1. An integrated-circuit device comprising:
    a bus system, configured to carry bus transactions and to carry security-state signals for distinguishing between secure bus transactions and non-secure bus transactions;
    a plurality of master components, each of the plurality of master components including circuitry, and each master component of the plurality of master components having a secure state and a non-secure state, wherein, when in the secure state, the respective master component initiates secure bus transactions, by outputting security-state signals to the bus system representative of secure bus transactions, and wherein, when in the non-secure state, the respective master component initiates non-secure bus transactions, by outputting security-state signals to the bus system representative of non-secure bus transactions;

a plurality of slave components; and
hardware filter logic,
wherein:
the hardware filter logic is configured to intercept bus transactions at an interception point within the bus system, the interception point being positioned within the bus system such that bus transactions from at least two of the master components pass the interception point, and such that bus transactions for at least two of the slave components pass the interception point; and
the hardware filter logic is configured, for each intercepted bus transaction, to use i) a slave address of the intercepted bus transaction, and ii) the security state of the intercepted bus transaction, to determine whether to allow the intercepted bus transaction, in accordance with a set of filtering rules, and is configured to block intercepted bus transaction that are determined not to be allowed.

2. The integrated-circuit device of claim 1, wherein the filtering rules determine, for each pairing of master component and slave component, whether secure bus transactions initiated by the master component are allowed to be received by the slave component, and whether non-secure bus transactions initiated by the master component should be received by the slave component.

3. The integrated-circuit device of claim 1, wherein the filtering rules are specified at a component level, such that, for each of the plurality of slave components, the hardware filter logic is configured to apply common filtering rules for each slave address assigned to the respective slave component.

4. The integrated-circuit device of claim 1, wherein the filtering rules are such that all secure bus transactions, initiated by any of the master components, are allowed to reach all of the plurality of slave components, but, for a set of one or more of the slave components, no non-secure bus transactions, initiated by any of the master components, are allowed to reach the set of slave components.

5. The integrated-circuit device of claim 1, wherein the filtering rules are different for different master components of the plurality of master components.

6. The integrated-circuit device of claim 1, wherein the interception point is located at a bus arbiter, or is located at bridge between a first bus and a second bus in the bus system, or is located between a first layer and a second layer of the bus system.

7. The integrated-circuit device of claim 1, wherein the hardware filter logic is configured to intercept bus transactions at one or more further interception points in the bus system.

8. The integrated-circuit device of claim 1, wherein the filtering rules are such that, for each interception point, there is at least one respective slave address for which a secure bus transfer is allowed to pass the interception point and for which a non-secure bus transaction is not allowed to pass the interception point.

9. The integrated-circuit device of claim 1, wherein a master component of the plurality of master components comprises a component core and a hardware security module, wherein the component core comprises a bus interface for initiating bus transactions without security-state signals, wherein the hardware security module is situated between the bus interface and the bus system, and wherein the hardware security module is switchable between a secure state and a non-secure state, and is configured to output a security-state signal onto the bus system for each bus transaction initiated by the component core, wherein the security-state signal indicates a secure bus transaction when the hardware security module is in the secure state, and indicates a non-secure bus transaction when the hardware security module is in the non-secure state.

10. The integrated-circuit device of claim 1, wherein each of the slave components has a respective security state, and wherein the filtering rules additionally depend on the security states of the slaves components, such that the hardware filter logic is additionally configured to use one or more slave-component security states when determining whether to allow or block each intercepted bus transaction.

11. The integrated-circuit device of claim 1, further comprising a memory, the memory comprising a secure region and a non-secure region, wherein the secure region is a first slave component of the plurality of components, and the non-secure region is a second slave component of the plurality of components.

12. The integrated-circuit device of claim 1, wherein the filtering rules further depend on whether the intercepted bus transaction is a data read, a data write, or an instruction fetch transaction, and wherein the hardware filter logic is configured to determine whether each intercepted bus transaction is a data read, a data write, or an instruction fetch transaction.

13. The integrated-circuit device of claim 1, comprising a security protection unit which provides a register interface, accessibly over the bus system, for switching one or more of the master components and/or one or more of the slave components between a secure state and a non-secure state.

14. The integrated-circuit device of claim 1, wherein the bus system comprises main bus and a peripheral bus, wherein the main bus comprises a main-bus security-state signal line for carrying the security-state signal, and wherein the peripheral bus comprises a peripheral-bus security-state signal line for carrying the security-state signal to one or more peripherals attached to the peripheral bus.

15. A method of operating an integrated-circuit device, wherein the integrated-circuit device comprises:
a bus system for carrying bus transactions and for carrying security-state signals for distinguishing between secure bus transactions and non-secure bus transactions;
a plurality of master components, each of the plurality of master components including circuitry, and each master component of the plurality of master components having a secure state and a non-secure state, wherein, when in the secure state, the respective master component initiates secure bus transactions, by outputting security-state signals to the bus system representative of secure bus transactions, and wherein, when in the non-secure state, the respective master component initiates non-secure bus transactions, by outputting security-state signals to the bus system representative of non-secure bus transactions; and
a plurality of slave components,
the method comprising:
the bus system carrying secure bus transactions and non-secure bus transactions;
intercepting bus transactions at an interception point within the bus system, the interception point being positioned within the bus system such that bus transactions from at least two of the master components pass the interception point, and such that bus transactions for at least two of the slave components pass the interception point;
using the address of an intercepted bus transaction and the security state of the intercepted bus transaction to determine whether to allow the intercepted bus transaction, in accordance with a set of filtering rules; and
blocking the intercepted bus transaction when the intercepted bus transaction is determined not to be allowed.

\* \* \* \* \*